Feb. 25, 1969 　　　L. G. SNODDY 　　　3,429,049
GRIP MEASUREMENT GAUGE FOR BOWLING BALLS
Filed May 25, 1967
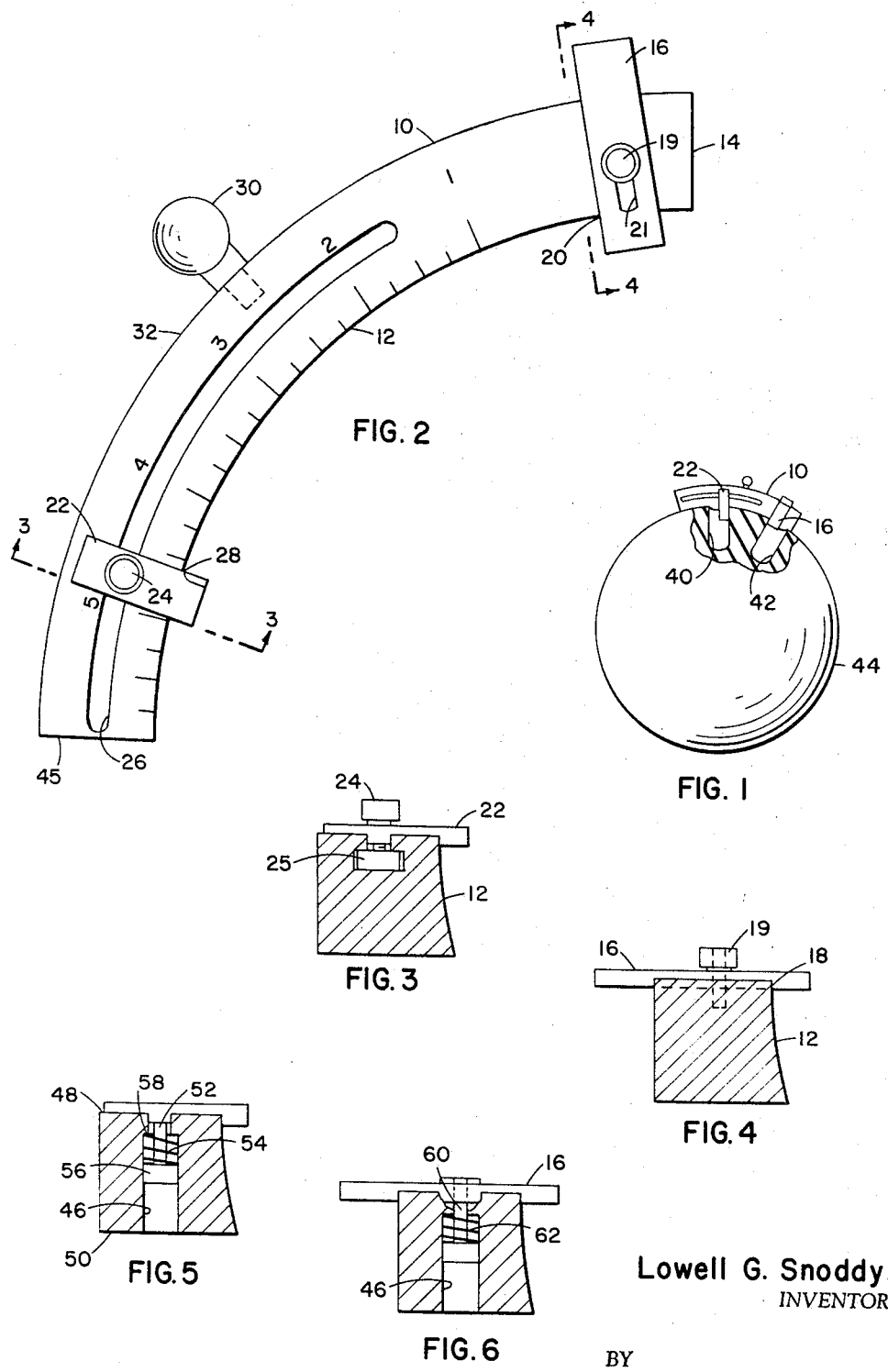
Lowell G. Snoddy,
INVENTOR.
BY
C. A. Phillips
ATTORNEY.

United States Patent Office 3,429,049
Patented Feb. 25, 1969

3,429,049
GRIP MEASUREMENT GAUGE FOR BOWLING BALLS
Lowell G. Snoddy, 419 Warner St. NW.,
Huntsville, Ala. 35805
Filed May 25, 1967, Ser. No. 641,299
U.S. Cl. 33—174      3 Claims
Int. Cl. G01b 3/38; A61b 5/10

ABSTRACT OF THE DISCLOSURE

A grip measurement gauge for bowling balls employing a gauge body contoured to the surface of bowling ball and having one fixed insert probe and another movable insert probe mounted on the side of the gauge body, on which side is a distance scale which permits the reading of the edge distance between thumb and finger holes in which are placed the insert probes.

---

This invention relates to measuring devices and particularly to gauges adaptable for use in connection with bowling balls or like spherical objects having two or more apertures in the peripherial surface thereof.

As is well known, bowling balls are provided with finger holes for gripping the ball and the spacing of the holes is varied in accordance with the finger span of the individual bowler.

In purchasing a new ball a bowler may normally present to the seller a ball which he has become accustomed to and which has a finger grip pattern and hole spacing of his particular liking or the bowler may vary the adjustable grip of a master ball to arrive at a hole pattern best suiting him. In either case the hole pattern must be measured to be duplicated and in the latter case, measurement by means of the present invention facilitates adjustment of the master ball during the fitting procedure.

It is the object of the present invention to provide an improved measurement gauge which permits rapid and accurate hole spacing measurements in a bowling ball with a minimum of adjustments and operation and which measurements may then be used to drill finger holes in a new ball.

In accordance with the invention, a grip measurement gauge is constructed of a rigid gauge body which has a concave surface conforming to the surface of a bowling ball. Near one end of the gauge body is positioned an insert or probe member which extends into one of the holes of the bowling ball and contacts one edge surface of the hole. A second insert or probe is positioned on the gauge body and it is mounted with a movable carrier which permits it to be positioned at varying distances from the first probe. It too is positionable with one of the other holes of the bowling ball against a near edge to the hole in which the first probe is positioned. A measurement scale is embodied on the same side of the gauge body with scale indications extending down the side of the gauge body to the surface in contact with the bowling ball.

The foregoing and other objects, features, and advantages of the invention will become more apparent from the following description when considered in conjunction with the drawings in which:

FIG. 1 is a view of a bowling ball having the device of this invention in position for measuring the distance between two of the holes of the ball;

FIG. 2 is an elevational view of an embodiment of the invention;

FIG. 3 is a sectional view taken along the lines 3—3 of FIG. 2;

FIG. 4 is a sectional view taken along the lines 4—4 of FIG. 2;

FIG. 5 is a sectional view of a second embodiment of the invention as viewed and from the same point as in FIG. 3; and FIG. 6 is a sectional view of the second embodiment of the invention as viewed from the same point as FIG. 4.

Referring to the drawings gauge body 10 is rigidly constructed of metal or a hard resin systems material. Gauge body 10 is annular in form with a length extending to substantially one fourth of a circle. A lower edge 12 of the gauge body is of a concave contour in two dimensions corresponding to the surface of a bowling ball. Near one end 14 and on a plane measurement surface of gauge body 10 is mounted a first insert or probe member 16 and it rides in a groove 18 to position insert 16 along a generally radial line of the bowling ball with which the gauge is used. The measurement surface thus conforms to a plane passing through the center of a ball or of a sphere conforming to the concavity of the gauge body. Probe member 16 is secured to gauge body 10 by bolt 19. With bolt 19 tightened probe 16 is held rigidly to gauge body 10 in a manner to maintain precise positioning of insert member 16 with respect to a reference point 20 on the lower edge 12 of gauge body 10 and edge of hole 42. This point corresponds to a point of intersection with a plane conforming to the plane of the measurement surface of the gauge body and hole edge. By loosening bolt 19 and by virtue of slot 21 probe 16 may be raised and removed from a ball to disengage the gauge from a ball.

A second insert probe 22 is movably mounted to be positioned at variable distances from probe 20 by means of a bolt 24 and cam 25 into which bolt 19 is threaded to hold probe 22. Cam 25 is adapted to slide in groove 26 permitting insert probe 22 to be positioned at a circular distance from insert probe 16 corresponding to the distance between holes in which insert probes 16 and 22 are placed. By adjusting the position of insert member 22 so that there is a snug fit of the device as held between the holes a very accurate hole edge to hole edge measurement can be read off at point 28 of the circular distance between hole edges, which is the measurement normally employed in drilling holes in a new bowling ball. The scale is normally calibrated in inches and the scale marks or indications extend to the surface contacting the ball to permit very accurate reading of the measurement. The scale divisions in the drawing are fairly large for purposes of illustration and in practice would be in smaller units such as one thirty-second inchs instead of quarter inches as illustrated. Knob 30 is attached to the upper surface 32 of gauge body 10 to provide a convenient means of handling the gauge.

In operation bolt 24 holding insert probe 22 is loosened in cam 25 and insert 22 is moved to permit positioning of insert members 16 and 22 within two holes 40 and 42 of a bowling ball and insert 22 moved sufficiently toward insert 16 to provide a snug fit between near surfaces of holes 40 and 42 of the bowling ball 44 in order to provide an accurate setting of the gauge. Then bolts 19 and 22 are tightened to hold the gauge in this position until one records his measurement, or, bolt 19 may be loosened and probe 16 retracted leaving probe 22 at its indicated position. The distances between the remaining holes of the ball are determined one at a time in the same manner. In this fashion all of the pertinent measurements are determined.

FIGS. 5 and 6 illustrate a variation in construction wherein instead of having groove 26 extend from end 45 for cam 25 to slide in, slot 46 goes all the way through gauge body 10 from side surface 48 opposite to side surface 50 except at each end (not shown) where the gauge body is solid. In this simpler construction, insert probe 22 is supported by bolt 52 with spring 54 acting between the head 56 of bolt 52 and shoulder 58 of slot 46 to frictionally hold probe 22 in place, but, permitting probe 22 to be lifted out of slot 46 and turned ninety degrees. By also retracting probe 16 the gauge may be used generally for measurements on the surface of the ball. Probe 16 is similarly supported by a bolt 60 and spring 62, and may be moved in and out of the hole of the ball without the necessity of loosening bolt 19 as in the case of the embodiment shown in FIGS. 2, 3 and 4. Otherwise the gauge of FIGS. 5 and 6 operates and is used in the same manner.

It is believed apparent that there has been presented in the foregoing description an improved means for measuring distances between holes in bowling balls to assure that quick and accurate measurements can be easily made.

In the claims:

1. A grip measurement gauge for measuring the distance between the near edges of finger holes in bowling balls comprising:
  (A) a rigid gauge body having as one surface on one side a concave spherical surface conforming to the surface of a bowling ball and having a plane measurement surface on one side of said gauge body which plane surface substantially corresponds to a plane perpendicular to a plane passing through the center of a sphere of the diameter corresponding to said concave surface of said rigid gauge body;
  (B) an index insert member mounted on and near one end of and on said measurement surface of said gauge body, said index insert member being positioned, and of a dimension, and including means for, removably extending into a first finger or thumb cavity of a bowling ball when said concave spherical surface of said gauge body is positioned on the surface of a bowling ball and engaging an edge of said first said cavity substantially at a point of intersection with said plane of said plane measurement surface of said rigid gauge body;
  (C) an indicator insert member being of a dimension and positionable to extend into a second finger or thumb cavity of a bowling ball and engaging an edge of a second finger or thumb cavity substantially at a point of intersection with said plane measurement surface of said gauge body and wherein the points of engagement of said index insert member and said indicator insert member are the closest edge points between the holes being gauged;
  (D) an indicator insert member mounting means supporting said indicator insert member, said mounting means being supported by and adapted to move in a circular path on said gauge body, said path being concentric with said concave spherical surface; and
  (E) an index scale on said measurement surface of said gauge body extending along said gauge body for at least a portion corresponding to that traversed by said path, said scale having radial lines intersecting said concave spherical surface.

2. The grip mesurement gauge set forth in claim 1 wherein said gauge body includes a groove comprising said circular path in a side of said gauge body other than the side of said measurement surface.

3. The grip measurement gauge set forth in claim 1 wherein said gauge body includes a slot between two opposite sides of said gauge body and said slot extending along said gauge body and comprising said circular path.

References Cited

UNITED STATES PATENTS

| | | | |
|---|---|---|---|
| 2,537,473 | 1/1951 | McCusker | 33—158 |
| 2,706,338 | 4/1955 | Ackerman et al. | 33—174 |
| 3,276,134 | 10/1966 | Szwajkowski | 33—174 |

SAMUEL S. MATTHEWS, *Primary Examiner.*